(12) United States Patent
Herzog et al.

(10) Patent No.: US 9,333,869 B2
(45) Date of Patent: May 10, 2016

(54) CHARGING APPARATUS FOR A VEHICLE WITH SEVEN ELECTRICAL CONTACTS

(71) Applicant: Bayerische Motoren Werke Aktiengesellschaft, Munich (DE)

(72) Inventors: Torsten Herzog, Munich (DE); Josef Krammer, Holzkirchen (DE); Michael Respondek, Mengkofen (DE); Robert Weber, Schliersee (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 146 days.

(21) Appl. No.: 14/212,248

(22) Filed: Mar. 14, 2014

(65) Prior Publication Data

US 2014/0197793 A1   Jul. 17, 2014

Related U.S. Application Data

(63) Continuation of application No. PCT/EP2012/050499, filed on Jan. 13, 2012.

(30) Foreign Application Priority Data

Sep. 16, 2011   (DE) .......................... 10 2011 082 897

(51) Int. Cl.
*H02J 7/00* (2006.01)
*B60L 11/18* (2006.01)
*H02J 7/02* (2016.01)

(52) U.S. Cl.
CPC .......... *B60L 11/1818* (2013.01); *B60L 11/185* (2013.01); *B60L 11/1811* (2013.01); *H02J 7/0055* (2013.01); *H02J 7/02* (2013.01); *B60L 2230/12* (2013.01); *Y02T 10/7005* (2013.01); *Y02T 10/7088* (2013.01); *Y02T 90/121* (2013.01); *Y02T 90/127* (2013.01); *Y02T 90/128* (2013.01); *Y02T 90/14* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS

| 5,545,046 | A |  | 8/1996 | Masuda et al. | |
|---|---|---|---|---|---|
| 5,670,830 | A | * | 9/1997 | Koga | B60K 6/46 180/65.245 |
| 5,758,414 | A |  | 6/1998 | Ehrenfels | |
| 5,883,494 | A |  | 3/1999 | Kobayashi et al. | |
| 6,619,342 | B2 |  | 9/2003 | Graham | B60L 11/1818 141/231 |
| 7,878,866 | B1 | * | 2/2011 | Kwasny | B60L 11/1818 439/474 |
| 8,548,659 | B2 | * | 10/2013 | Tanaka | B60K 6/48 180/65.1 |
| 8,616,447 | B2 | * | 12/2013 | Bianco | G07F 9/10 235/381 |
| 8,872,473 | B2 | * | 10/2014 | Song | B60L 7/14 320/109 |
| 2011/0169447 | A1 | * | 7/2011 | Brown | B60L 3/0069 320/109 |
| 2011/0300733 | A1 | * | 12/2011 | Janarthanam | B60L 11/1818 439/304 |
| 2012/0212179 | A1 | * | 8/2012 | Nathan | H01R 13/6683 320/109 |
| 2012/0263242 | A1 | * | 10/2012 | Heuer | B60L 11/1818 375/257 |

FOREIGN PATENT DOCUMENTS

| DE | 10 2008 046 235 B3 | 4/2010 |
|---|---|---|
| DE | 10 2009 052 366 A1 | 7/2010 |
| DE | 10 2009 025 302 A1 | 12/2010 |
| DE | 10 2010 053 072 A1 | 8/2011 |
| WO | WO 2011/003317 A1 | 1/2011 |

OTHER PUBLICATIONS

International Preliminary Report on Patentability (PCT/IB/326) and (PCT/IB/373) dated Mar. 27, 2014 including Written Opinion (PCT/ISA/237) (nine (9) pages).
Corresponding International Search Report with English Translation dated Jul. 19, 2012 (four (4) pages).
German Search Report with English Translation dated Sep. 4, 2012 (nine (9) pages).
Norm SAE J 1772 Revised Jan. 2010, p. 36.

* cited by examiner

*Primary Examiner* — Arun Williams
(74) *Attorney, Agent, or Firm* — Crowell & Moring LLP

(57) ABSTRACT

A vehicle charging apparatus includes a charging source, a charging plug, a charging socket, a charging control device, an alternating-current charging device and a power switching device. The charging socket has seven electrically assignable contacts, the first contact being connected as a pilot contact by way of a pilot line with the charging control device, the second contact being connected as proximity contact by way of a proxy line with the charging control device, the third contact being connected as a protective grounding conductor contact by way of a ground line with the vehicle ground, the fourth contact being connected as a neutral conductor contact by way of a neutral line with the alternating-current charging device, the fifth contact being connected as a phase 1 contact by way of a phase 1 line with the alternating-current charging device, the sixth contact being connectable as a positive direct-current contact by way of a DC+ line and by way of the power separating device with an energy accumulator, and the seventh contact being connectable as a negative direct-current contact by way of a DC− line and by way of the power separating device with the energy accumulator. The DC+ line is connected by way of a first electric branch line with the neutral line or the phase 1 line, and the DC− line is connected by way of a second electric branch line with the neutral line or the phase 1 line.

9 Claims, 2 Drawing Sheets

CHARGING APPARATUS FOR A VEHICLE WITH SEVEN ELECTRICAL CONTACTS

CROSS REFERENCE TO RELATED APPLICATIONS

This application is a continuation of PCT International Application No. PCT/EP2012/050499, filed Jan. 13, 2012, which claims priority under 35 U.S.C. §119 from German Patent Application No. 10 2011 082 897.4, filed Sep. 16, 2011, the entire disclosures of which are herein expressly incorporated by reference.

This application contains related subject matter to U.S. patent application Ser. No. 14/212,005, filed on even date herewith, entitled "Charging Apparatus for a Vehicle."

BACKGROUND AND SUMMARY OF THE INVENTION

The invention relates to a charging apparatus for a vehicle having an energy accumulator (energy store), the charging apparatus comprising a charging source, a charging plug, a charging socket, a charging control device, an alternating-current (AC) charging device and a power switching device, and the charging socket has seven electrically assignable contacts, the first contact being connected as a pilot contact by way of a pilot line with the charging control device, the second contact being connected as a proxy contact by way of a proximity line with the charging control device, the third contact being connected as a protective ground conductor by way of a grounding line with the vehicle ground, the fourth contact being connected as a neutral conductor contact by way of a neutral line with the alternating-current charging device, and the fifth contact being connected as a phase 1 contact by way of a phase 1 line with the alternating-current charging device.

World-wide, vehicles with an electrified drive train are considered the key for the individual mobility of the future. Modern vehicle development is working on solutions for charging a vehicle-internal accumulator for the electric traction energy. Wired decentralized charging methods are currently being favored. This means that a surface-related density of external charging sources for the vehicle is available to the driver, where the average range of the vehicle corresponds at least to the average distance between two charging sources. A high charging comfort is distinguished by a high charging rate, i.e. brief charging periods, and by a high availability of charging sources for the vehicle; i.e. by high compatibility of the external charging sources with the vehicle.

According to the state of the art, a vehicle-side charging socket for a wired charging plug is being established; see, for example, the International Draft Standard IEC 62196. The 5-pole plug called Type 1 in this Draft Standard 62196 offers the user the possibility of charging the battery of the vehicle with alternating current (AC) by way of the 1-phase alternating-current network and/or with direct current (DC) if the charging source makes these two charging types available. In this case, for charging with direct current, the power is limited to a current intensity of maximally approximately 80 A with a voltage of maximally 300 V-480 V. If a charging source provides the charging with direct current up to a current density of maximally 200 A and of a voltage of maximally 600 V-850 V and thereby permits a faster charging, according to Draft Standard IEC 62196, a plug-socket system called Combo 1 is used which has special direct-current contacts.

If a vehicle is equipped with a charging socket for the type 1 plug, the user cannot charge the accumulator with a charging direct current of more than 80 A at a charging source having a Combo 1 plug.

It is an object of the invention to provide an improved charging apparatus for the electric charging of an energy accumulator of a vehicle.

This and other objects are achieved by a charging apparatus for a vehicle having an energy accumulator, the charging apparatus comprising a charging source, a charging plug, a charging socket, a charging control device, an alternating-current charging device and a power switching device. The charging socket has seven electrically assignable contacts. The first contact is connected as a pilot contact by way of a pilot line with the charging control device. The second contact is connected as proximity contact by way of a proxy line with the charging control device. The third contact is connected as a protective grounding conductor contact by way of a ground line with the vehicle ground. The fourth contact is connected as a neutral conductor contact by way of a neutral line with the alternating-current charging device. The fifth contact is connected as a phase 1 contact by way of a phase 1 line with the alternating-current charging device. The sixth contact is connectable as a positive direct-current contact by way of a DC plus line and by way of the power separating device with the energy accumulator. The seventh contact is connectable as a negative direct-current contact by way of a DC minus line and by way of the power separating device with the energy accumulator. The DC plus line is connected by way of a first electric branch line with the neutral line or the phase 1 line, and the DC minus line is connected by way of a second electric branch line with the neutral line or the phase 1 line.

According to the invention, the sixth contact is connected as a positive direct-current contact by way of a DC plus line and by way of the power separating device with the energy accumulator; the seventh contact is connected as a negative direct-current contact by way of a DC minus line and by way of the power separating device with the energy accumulator; the DC plus line is connected by way of a first electric branch line with the neutral line or the phase 1 line; and the DC minus line is connected by way of a second electric branch line with the neutral line or the phase 1 line.

This has the advantage that an external direct voltage situated between the fourth contact and the fifth contact is also applied between the DC plus line and the DC minus line 1. If, in this case, the higher electric potential of the potential difference between the fourth contact and the fifth contact is at the fifth contact, the DC plus line is connected by way of the first electric branch line with the fifth contact, and the DC minus line is connected by way of the second electric branch line with the fourth contact. If the higher electric potential between the fourth contact and the fifth contact is at the fourth contact, the DC plus line is connected by way of the first electric branch line with the fourth contact, and the DC minus line is connected by way of the second electric branch line with the fifth contact.

According to a preferred embodiment of the invention, the charging socket has a protective cap operable by the charging control device or by the operator, by which protective cap, an opened position can be taken up, and by which a closed position can be taken up. In the closed position, the DC plus contact and the DC minus contact are covered.

The protective cap results in the special advantage that the DC plus contact and the DC minus contact can be covered, so that, within the scope of the intended usage of the charging apparatus for the operator, these two contacts will not be freely accessible when the protective cap is closed.

According to a further variant of the present invention, the charging socket has a cap sensor by which the position of the protective cap can be detected. Furthermore, according to this variant, the invention comprises a data connection between the cap sensor and the charging control device, by way of which data connection, the detected position of the protective cap can be transmitted to the charging control device by the cap sensor.

By use of the cap sensor, the protective cap can be recognized as being in a defined position. If required, the protective cap can be adjusted into the other position by the charging control device. As an alternative, a false position of the protective cap can be indicated to the operator.

Preferably, a first charging plug in the form of a plug-and-socket connection can be attached to the charging socket when the protective cap is open or when the protective cap is closed, which first charging plug is constructed with at least 3 poles and not more than 5 poles. At least three core poles of the first charging plug are electrically assigned, in the case of a plug-socket connection established by means of the first charging plug, the first three contacts being connected with the same assignments with the core poles of the first charging plug, and the not more than 5 poles being connected with the same assignments with the first five contacts of the socket. When the plug-socket connection is established with the first charging plug, the protective cap can be closed or is closed.

With respect to its basic geometrical shape, the first charging plug may, for example, be constructed as a plug of Type 1, according to the International Draft Standard IEC 62196, and the charging socket of the vehicle, with respect to its geometrical design, may be constructed as a charging socket of the Combo-1 type. The core poles of the charging plug are the poles of the plug which, when the plug-socket connection is established in accordance with the regulations, are electrically contacted with the pilot contact, the proxy contact and the grounding conductor contact.

According to a further embodiment of the invention, when the plug-socket connection is established with the first charging plug, while the power connection is separated by the power switching device and, in the case of an electric assignment of the fourth contact and of the fifth contact with alternating voltage by the charging source, the battery can be charged by way of the alternating-current charging device.

This means that the user of the charging apparatus can connect the vehicle with a charging source, which provides 1-phase alternating current, for charging the energy accumulator by way of the first charging plug.

As an alternative, when the plug-socket connection is established with the first charging plug and in the case of an electric assignment of the fourth contact and of the fifth contact with direct voltage by the charging source, the battery can be charged with direct voltage when the power connection is established by the power switching device and the protective cap is closed.

If, according to the Draft Standard IEC 62196, the first charging plug is constructed as a Type 1 plug and the charging socket is constructed as Combo-1, the charging source provides direct current, and the user connects the vehicle with the charging source by way of the first charging plug, the energy accumulator can be charged with direct current when the protective cap is closed. According to the Draft Standard IEC 62196, the direct current for the charging with direct current for the Type 1 plug is limited to maximally 80 A. The type of charging is called DC low charging. It is a prerequisite for DC low charging with the Type 1 plug that the charging control device can detect that the protective cap is in the closed position, so that the positive direct-current contact and the negative direct-current contact cannot be touched in a freely accessible manner from the outside.

If the charging source can provide 1-phase alternating current as well as direct current, the charging control device can select and implement one of the two types of charging based on various parameters of the energy accumulator and of the charging source. This particularly relates to the adjustment of the power switching device. A selected charging operation is controlled, or automatically controlled, according to the state of the art by the charging control device.

According to a further embodiment of the invention, a second charging plug in the form of a plug-socket connection can be attached to the charging socket when the protective cap is open. According to this embodiment, the second charging plug is constructed with at least three poles and not more than seven poles, in which case at least three core poles of the second charging plug are electrically assigned. When the plug-socket connection is established with the second charging plug, the first three contacts are connected with the same assignments with the core poles of the second charging plug, and the not more than seven poles are connected with the same assignments with the seven contacts of the socket.

With respect to their basic geometrical shape, the second charging plug and the charging socket can, for example, be constructed as a Combo-1 plug and a Combo-1 charging socket according to the International Draft Standard IEC 62196. The core poles of the charging plug are the poles of the plug which, if the plug-socket connection is established in accordance with the regulations, are electrically contacted with the pilot contact, the proxy contact and the grounding conductor contact. The further four contacts of the socket are contacted with the same assignments with maximally four further poles of the plug, i.e. predetermined poles of the plug may be present for certain further contacts of the socket.

Preferably, when the plug-socket connection is established with the second charging plug and with the electric assignment of the sixth contact and of the seventh contact with direct voltage by the charging source, the battery can be charged when the power connection is established by the power switching device.

If the charging source provides the direct voltage for the charging, when the plug-socket connection is established with the second charging plug, the energy accumulator can also be charged with direct current at a current intensity of more than 80 A. This type of charging is called DC high charging.

As an alternative, when the plug-socket connection is established with the second charging plug and in the case of an electric assignment of the fourth contact and of the fifth contact with alternating voltage by the charging source, the battery can be charged by way of the alternating-voltage charging device if the power connection is separated by the power switching device.

This means that, with the second charging plug, the energy accumulator can also be charged with alternating current if the charging source provides 1-phase alternating voltage. If the charging source, while the plug-socket connection is established with the second charging plug, 1-phase alternating current as well as direct current can be provided for DC high charging, one charging type can be selected and implemented based on various parameters of the energy accumulator and of the charging source. In particular, the corresponding adjustment of the power switching device takes place. A selected charging operation is controlled, or automatically controlled, according to the state of the art by the charging control device. The direct voltage, which is also present at the alternating-current charging device during direct-current charging, requires a voltage-enduring design of the alternating-current charging device.

The charging apparatus has the advantage that, by way of two different plugs, a plug-socket connection and thereby a charging connection can be established between the vehicle and the charging source. The user of the vehicle can establish a charging connection independently of the type of charging supported by the charging source (alternating current, DC low, DC high) and the used plug (Type 1 or Combo-1). As a function of the charging type supported by the charging source (alternating current, DC low, DC high) and the used plug (Type 1 or Combo-1), the charging control device can carry out that charging operation that appears suitable on the basis of different existing influencing variables.

The invention is based on the considerations described in the following. For electric and hybrid vehicles, different conductive, i.e. wired, charging technologies exist at an external charging source. One of these wired charging variants is AC charging, i.e. alternating-current charging, in which case the charging apparatus is situated in the vehicle. Another wired charging variant is DC charging, i.e. direct-current charging, in which case the charging apparatus is situated in the external charging station. DC charging is frequently also called rapid charging because the charging capacity is normally above that of the AC charging.

The international plug Draft Standard IEC 62196 describes a novel plug-socket system that is also called a Combo plug system. It thereby becomes possible to connect a plug, which permits an AC charging, to a single vehicle charging socket. A plug permitting DC charging can also be connected to this vehicle charging socket. A vehicle having such a charging topology on the basis of the Combo plug system can charge at an AC charging station as well as also at a DC charging station, the vehicle having only one installed charging connection.

The Combo plug system includes a charging socket and a charging plug. The charging socket is mounted at the vehicle. The charging plug, which is also called a coupler, is fixedly connected with the charging station by way of the charging cable during DC charging.

Draft Standard IEC 62196 describes different plug-socket variants. This relates, for example, to a plug that is called Type 1 and to a plug that is called Combo 1. As a function of the charging source, the vehicle with the Type 1 plug can be charged with direct current, the plug being designed for a charging current of up to 80 A. This charging variant is called DC low charging. By means of a plug of the Type 1 Combo plug, the vehicle can be charged with direct current, the plug being designed for a charging current of up to 200 A. This charging variant is called DC high charging. For this purpose, the Type 1 Combo plug has two poles designed for a high current load capacity, which are also called DC high poles. The further poles of the Type 1 Combo plug are called core poles. By means of both plugs, the vehicle can also be charged with alternating current depending on the charging station.

Independently of the plug to be attached to the vehicle (according to the IEC 62196, for example, a Type 1 plug, a Type 2 plug, a Type 1 Combo plug or a Type 2 Combo plug), the vehicle has a charging architecture which includes an AC charging device, a communication unit and a DC protective contactor system for the power switching. The AC charging device is required exclusively for AC charging. The DC protective contactor system ensures that no dangerous voltage is present at the charging socket. It needs to be ensured for reasons of safety that no high voltage is present on parts that may be touched, such as, for example, exposed contacts of the charging socket.

According to the state of the art, a spreading of different external charging possibilities for vehicles is becoming apparent, which permit charging according to different charging variants. This has the disadvantage that a complex charging architecture has to be present in the vehicle which permits the charging of as many charging variants as possible.

The charging architecture should particularly permit DC low charging and DC high charging and be compatible with the Type 1 plug and the Type 1 Combo plug.

An improved charging architecture is therefore provided which has a charging socket for a Type 1 Combo plug. DC high charging is thereby made possible. Since a charging socket for the Type 1 Combo plug is compatible with the Type 1 plug, DC low charging can also be made possible with the indicated charging socket. In the charging socket, the pins intended for DC low charging are electrically connected with the pins for the DC high charging pertaining to DC high poles. The charging socket therefore has a detectable protective cap by which the pins of the charging socket pertaining to the DC high poles can be covered. This ensures that, during DC low charging, the pins pertaining to the DC high poles will not be freely accessible so as to be touched from the outside. In this manner, no separate protections are required for the pins intended for the DC low charging. When using the Type 1 Combo plug, the cap will be open; when using the Type 1 plug, the cap will preferably be closed.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
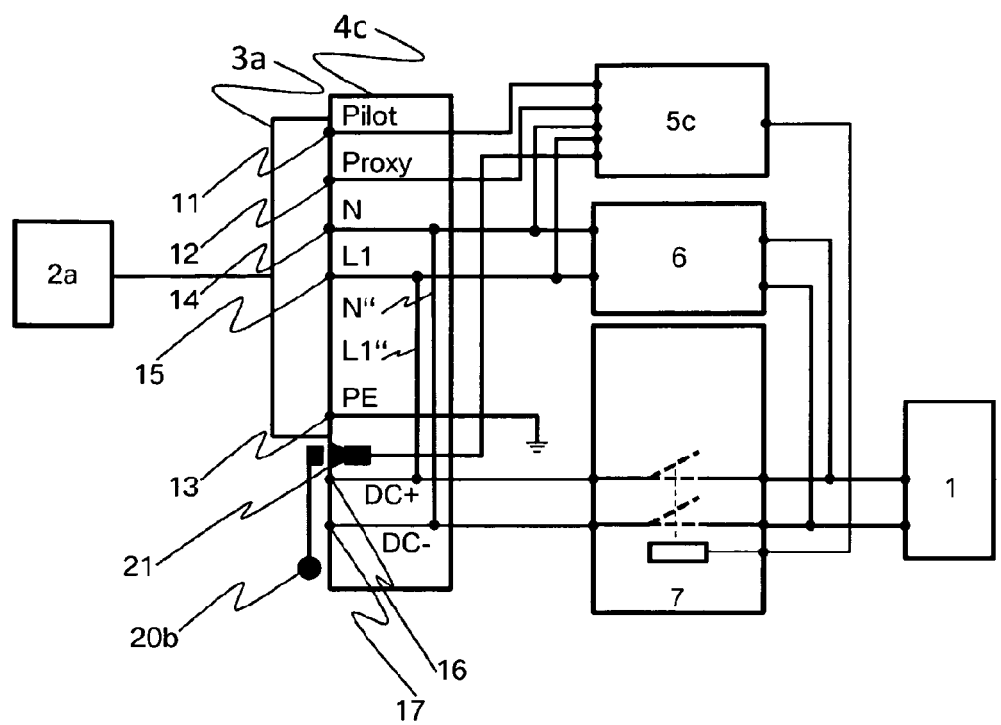
FIG. 1 is a schematic view of a charging apparatus having a maximum 7-pole charging plug and a protective cap, with DC low charging while the protective cap is closed.
Figure 2:
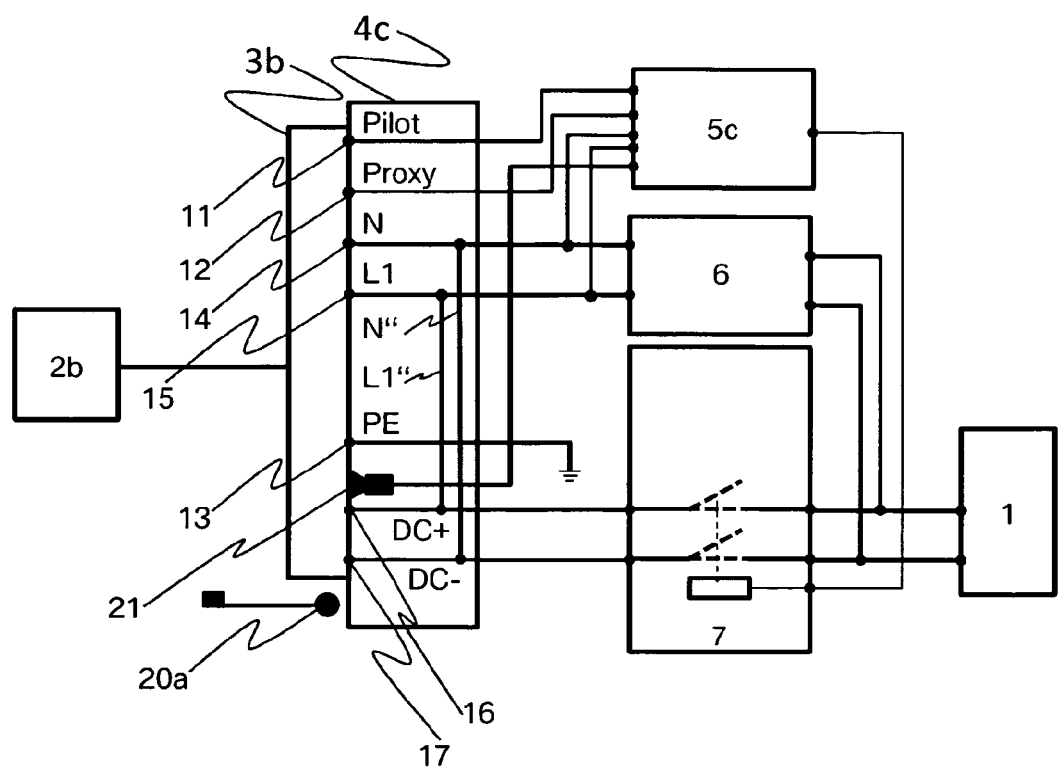
FIG. 2 is a schematic view of a charging apparatus having a maximum 7-pole charging plug and a protective cap, with DC high charging while the protective cap is open.

FIGS. 1 and 2 illustrate an implemented example of the invention. A charging apparatus for an energy accumulator 1 of a vehicle is described.

A charging source (2a or 2b) is situated outside the vehicle. Depending on the type of construction and configuration of the charging source, the charging source provides 1-phase alternating current and/or direct current for charging the energy accumulator. The charging source may, for example, be constructed as a public charging station or as a wall box installed in the vehicle user's home area.

The vehicle has a charging socket 4c, which is usually integrated in the area of the body shell in the vehicle and can optionally be made accessible from the outside by way of a cover cap similar to a common fuel filler cap.

In addition, the vehicle has a charging control device 5c, a charging apparatus 6, which is represented in FIGS. 1 and 2 as a 1-phase alternating-current charging device, and a contactor box with two contactors 7 which are used as power switching devices. For the power switching and disruption, a MOSFET circuit can also used as an alternative, in order to, if required, electrically separate the energy accumulator 1 from the charging apparatus 6 or link it to the latter. Without limiting the generality, it will be assumed in the following that a contactor switching is used.

In FIGS. 1 and 2, the charging socket 4c of the vehicle has seven electrically assigned contacts. The first electric contact 11 is connected by way of a pilot line (pilot) with the charging control device 5c and is called a pilot contact. The second electric contact 12 is connected by way of a proximity line (proxy) with the charging control device 5c and is called a proximity contact. The third electric contact 13 is connected by way of a ground line (PE, protective earth) with the vehicle ground and is called a ground contact. The fourth electric contact 14 is implemented as a neutral conductor contact and is connected by way of a neutral line (N) with the charging apparatus 6. The fifth electric contact 15 is designed as a phase contact (phase-1-contact) and is connected by way of a phase line (L1) with the charging apparatus 6. The sixth electric contact 16 is connected by way of a direct-current line (DC+) with one of the two contactors of the contactor box and is called a positive direct-current contact. The seventh electric contact 17 is connected by way of a direct-current line (DC−) with that contactor of the two contactors of the contactor box that is not connected with the direct-current line (DC+). The seventh contact is called a negative direct-current contact.

The positive direct-current contact is short-circuited by way of the electric branch line (L1") with the phase-1 contact 15. The negative direct-current contact is short-circuited by way of the electric branch line (N") with the neutral conductor contact 14. The short circuit between the phase-1 contact and the positive direct-current contact, and the short circuit between the neutral conductor contact and the negative direct-current contact preferably takes place within the charging socket 4c by the connection with a power supply bar or by crimping the concerned lines.

The charging socket 4c in FIGS. 1 and 2 has a protective cap, which can take up a closed position (20b in FIG. 1) or an open position (20a in FIG. 2). The position of the cap can be determined by a cap sensor 21, and information concerning the cap position can be transmitted to the charging control device 5c. The recognition of the cap position can be based on the detection of a magnetic field of the cap or of a part of the cap by means of a Hall sensor. Furthermore, the position of the cap can be mechanically adjusted by the charging control device 5c.

In FIG. 1, a charging plug 3a can be connected to the charging socket 4c. The charging plug is connected with the charging source 2a by way of a cable. The charging plug 3a has maximally five poles. In this case, it should be taken into account that not necessarily every pole of the charging plug also has to be electrically assigned. A charging plug may, for example, be used which has a 7-pole construction and, in this case, has five assigned poles, i.e. five electrically active poles. The unassigned poles may be made of a conductive or non-conductive material or at best may be implemented as briefly indicated. The charging plug 3a is connected with the charging source 2a by way of a cable. Current charging plugs have at least three electric poles which, in the case of a charging connection, are connected with the pilot contact, the proximity contact and the ground contact. By way of the proximity contact, the charging connection and the charging plug can be identified by the charging control device 5c and an immobilizer of the vehicle can, for example, be activated. In the case of a charging connection, the pilot line permits a communication between the charging control device 5c and the charging source 2a and the control or automatic control of a charging operation.

An exclusive plug-socket connection with the same assignment can be established between the charging plug and the charging socket. In FIG. 1, this means that, in the case of a charging connection, every electric pole of the plug can be electrically connected with a single predetermined contact of the first seven contacts of the charging socket, if used in accordance with the regulations.

In FIG. 1, a Type 1 plug of the International Draft Standard IEC 62196 for the wired charging of electric vehicles is used without limiting the generality. Accordingly, direct current can be charged up to a current of 80 A and a voltage of up to 300 V-480 V. In this document, this type of direct-current charging is called DC low charging.

When, in FIG. 1, by way of the charging source 2a, for example, in the case of a charging connection between the fourth contact 14 and the fifth contact 15, a 1-phase alternating voltage is present, the energy accumulator can be charged by way of the charging apparatus when the contactors are open.

When the charging source provides direct current for DC low charging, by way of the neutral conductor contact 14 and the phase-1 contact 15, the energy accumulator, when the contactors are closed, can be charged under the condition that the protective cap is closed by the charging control device 6 and the cap sensor transmits information concerning the closed position of the protective cap to the charging control device. Only then can the contactors be closed by the charging control device for the charging.

The closed protective cap for DC low charging ensures that the negative direct-current contact 17 and the positive direct-current contact 16 during DC low charging are not freely accessible to touch from the outside with respect to the vehicle body. This is necessary for the personal safety of the operator or user of the charging apparatus.

Since the direct-current lines (DC+ and DC−) are designed for DC high charging, according to the design, DC low charging is possible with these direct-current lines. The two branch lines are also designed for DC low charging.

In FIG. 2, a charging plug 3b can be connected to the charging socket 4c when the protective cap is open. The charging plug is connected with the charging source 2b by a cable. The charging plug has maximally seven poles. Attention should be paid to the fact that not necessarily every pole of the charging plug also has to be electrically assigned. Accordingly, for example, a charging plug can be used which is constructed with 7 poles and in this case has five assigned poles, i.e. five electrically active poles. The unassigned poles may be made of a conductive or non-conductive material or at best may be implemented as briefly indicated.

An exclusive plug-socket connection with the same assignment can be established between the charging plug and the charging socket. In FIG. 2, this means that, in the case of a charging connection, every electric pole of the plug is electrically connected with a predetermined contact of the seven contacts of the charging socket.

Assignment equality means that, in the case of an established plug-socket connection with the same assignments, every electric pole of the plug is electrically connected with a predetermined electric contact of the seven electric contacts of the charging socket. This can be ensured, for example, by a mechanical guidance of the plug in the charging socket by use of projections, noses or bars.

In FIG. 2, a Combo-1 plug of International Draft Standard IEC 62196 for the wired charging of electric vehicles is used without limiting the generality. Accordingly, direct current can be charged up to a current of 200 A and a voltage of up to 600 V-850 V. In this document, this type of direct-current charging is called DC high charging and permits a faster charging of the energy accumulator in comparison to the DC low charging.

When, in FIG. 2, by way of the charging source, for example, in the case of a charging connection between the fourth contact 14 and the fifth contact 15, a 1-phase alternating voltage is present, the energy accumulator can be charged by way of the charging apparatus when the contactors are open.

When the charging source provides direct current for DC high charging, by way of the positive direct-current contact 16 and the negative direct-current contact 17, the energy accumulator can be charged while the contactors are closed. The alternating-current charging device is designed for withstanding voltage such that the direct voltage present at the input of the alternating-current charging device neither results in an electric effect, nor leads to a functional impairment of the charging apparatus.

The advantage of a charging apparatus having a charging socket according to FIG. 1 or FIG. 2 is achieved by the fact that, irrespective of whether the Type 1 plug or the Type 1-Combo plug is available at a charging source, and irrespective of which charging type (alternating-current charging, DC low charging or DC high charging) is provided by the charging source, the energy accumulator of the vehicle is not only chargeable, but the type of charging provided by the charging station which allows the briefest charging period, can also be selected by the charging control device. This results in a high degree of flexibility for the user as well as a high availability of charging variants at a plurality of charging sources. The technical solution of FIGS. 1 and 2 can be implemented in a cost-effective and installation-space-saving manner. The charging apparatus is easily operable for the user. In addition, it assures the user of a high degree of physical protection from touching high-voltage components.

The implemented charging apparatuses are also suitable for transmitting electric energy into the vehicle in order to supply electric consuming devices of the vehicle with electric power when the vehicle is stationary and if the charging connection is established. An electric linking of these consuming devices can take place, for example, by way of the poles of the energy accumulator and possibly interposed DC converters. This is advantageous particularly in the case of a defective energy accumulator or in the case of an energy accumulator with a limited charge acceptance (for example, in the case of a full state of the charge).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging apparatus for charging an energy accumulator of a vehicle via a charging source having a charging plug, the charging apparatus comprising:
   a charging control device of the vehicle;
   an alternating-current charging device of the vehicle;
   a power switching device of the vehicle,
   a charging socket of the vehicle, the charging socket comprising seven electrically assignable contacts, wherein
   a first contact is connected as a pilot contact by way of a pilot line with the charging control device,
   a second contact is connected as a proximity contact by way of a proxy line with the charging control device,
   a third contact is connected as a protective grounding conductor contact by way of a ground line with vehicle ground,
   a fourth contact is connected as a neutral conductor contact by way of a neutral line with the alternating-current charging device,
   a fifth contact is connected as a phase 1 contact by way of a phase 1 line with the alternating-current charging device,
   a sixth contact is connectable as a positive direct-current contact by way of a DC+ line and by way of the power switching device with the energy accumulator,
   a seventh contact is connectable as a negative direct-current contact by way of a DC− line and by way of the power switching device with the energy accumulator,
   the DC+ line is connected via a first electric branch line with one of the neutral line or the phase 1 line, and
   the DC− line is connected by way of a second electric branch line with the other of the neutral line or the phase 1 line.

2. The vehicle charging apparatus according to claim 1, further comprising:
   a protective cap configured for the charging socket, wherein
   the protective cap is openable into an opened position and closeable to provide a closed position, and
   in the closed position, the positive direct-current contact and the negative direct-current contact are covered.

3. The vehicle charging apparatus according to claim 2, further comprising:
   a sensor configured to detect a position of the protective cap;
   a data connection arranged between the sensor and the charging control device, wherein
   a detected position of the protective cap is transmitted via the data connection from the sensor to the charging control device.

4. The vehicle charging apparatus according to claim 3, wherein
   a first charging plug is attachable to the charging socket to form a plug-socket connection when the protective cap is in the opened position or the closed position,
   the first charging plug comprises at least three poles and no more than five poles, at least three core poles of the first charging plug being electrically assigned,
   when the plug-socket connection is established via the first charging plug, the first, second, and third contacts of the charging socket are connected with same assignments with the three core poles of the first charging plug,
   when the plug-socket connection is establish via the first charging plug and the charging socket, the no more than five poles are connected with associated ones of the first, second, third, fourth, and fifth contacts of the charging socket, and
   when the plug-socket connection is establish with the first charging plug, the protective cap is in a closed position or an opened position.

5. The vehicle charging apparatus according to claim 4, wherein when the plug-socket connection is establish with the first charging plug, in a case of an electric assignment of the fourth contact and the fifth contact with alternating-current from the charging source, the energy accumulator is chargeable via the alternating-current charging device while a power connection is separated by the power switching device.

6. The vehicle charging apparatus according to claim 4, wherein
when the plug-socket connection is established with the first charging plug, in a case of an electric assignment of the fourth contact and fifth contact with direct current from the charging source, the energy accumulator is chargeable when a power connection is established by a power switching device and the protective cap is in the closed position.

7. The vehicle charging apparatus according to claim 3, wherein
a second charging plug is attachable to the charging socket when the protective cap is in an open condition to form a plug-socket connection,
the second charging plug comprises at least three poles and no more than seven poles,
at least three core poles of the second charging plug are electrically assigned,
when the plug-socket is established via the second charging plug, the first, second, and third contacts of the charging socket are connected with associated ones of the at least three core poles of the second charging plug, and
when the plug-socket connection is established with the second charging plug, the no more than seven poles are connected with associated ones of the first through seventh contacts of the charging socket.

8. The vehicle charging apparatus according to claim 7, wherein
when the plug-socket connection is established with the second charging plug, with the electric assignment of the sixth contact and the seventh contact with direct current from the charging source, the energy accumulator is chargeable when the power connection is established by the power switching device.

9. The vehicle charging apparatus according to claim 7, wherein
when the plug-socket connection is established with the second charging plug, in a case of an electric assignment of the fourth contact and a fifth contact with alternating current from the charging source, the energy accumulator is chargeable by way of the alternating-current charging device while the power connection is separated by the power switching device.

* * * * *